United States Patent [19]

Butler

[11] Patent Number: 4,793,575
[45] Date of Patent: Dec. 27, 1988

[54] EMERGENCY PARACHUTE PACK

[76] Inventor: Manley C. Butler, 1539 N. China Lake Blvd., Ste. 630, Ridgecrest, Calif. 93555

[21] Appl. No.: 45,044

[22] Filed: May 1, 1987

[51] Int. Cl.⁴ .............................................. B64D 17/50
[52] U.S. Cl. .................... 244/148; 244/151 R
[58] Field of Search ................... 244/148, 151 R, 142, 244/147

[56] References Cited

U.S. PATENT DOCUMENTS

| | | | |
|---|---|---|---|
| 1,944,801 | 1/1934 | Nichols | 244/148 |
| 2,114,301 | 4/1938 | Harrigan | 244/148 |
| 3,602,463 | 8/1971 | Koochembere | 244/148 |
| 3,908,937 | 9/1975 | Poynter | 244/148 |
| 4,039,164 | 8/1977 | Booth | 244/148 |
| 4,150,464 | 4/1979 | Tracy | 24/77 R |
| 4,171,555 | 10/1979 | Bakker et al. | 24/200 |
| 4,337,913 | 7/1982 | Booth | 244/151 B |

FOREIGN PATENT DOCUMENTS

| | | | |
|---|---|---|---|
| 1461682 | 12/1966 | France | 244/148 |
| 903777 | 8/1962 | United Kingdom | 244/148 |
| 968343 | 9/1964 | United Kingdom | 244/148 |

OTHER PUBLICATIONS

M. Butler, "The Design, Testing, Certification and Production of an Emergency Parachute for Use in Light Aircraft," Paper No. AIAA-81-0413 (Jan. 1981).
J. Murray, "The E-2C Aircraft Crew Backpak," Paper No. 2450-CP (date unknown).
D. Poynter, *The Parachute Manual: A Technical Treatise on Aerodynamic Decelerator* (3d. Ed., 1984, Santa Barbara).
ParaGear 1984–85 Catalog No. 50.

Primary Examiner—Galen Barefoot
Assistant Examiner—Rodney Corl
Attorney, Agent, or Firm—Lyon & Lyon

[57] ABSTRACT

A chest-mountable emergency parachute pack is provided having an upper compartment for a parachute and a lower compartment for an inflatable flotation device such as a life raft. A rear compartment for an inflatable personal flotation device such as a life vest may be provided. Additional pockets may store other survival equipment. The pack is provided with means for attachment to a custom-filled harness which is worn by a crew member. In an emergency, the parachute pack may be quickly attached to the harness for appropriate emergency procedures.

12 Claims, 3 Drawing Sheets

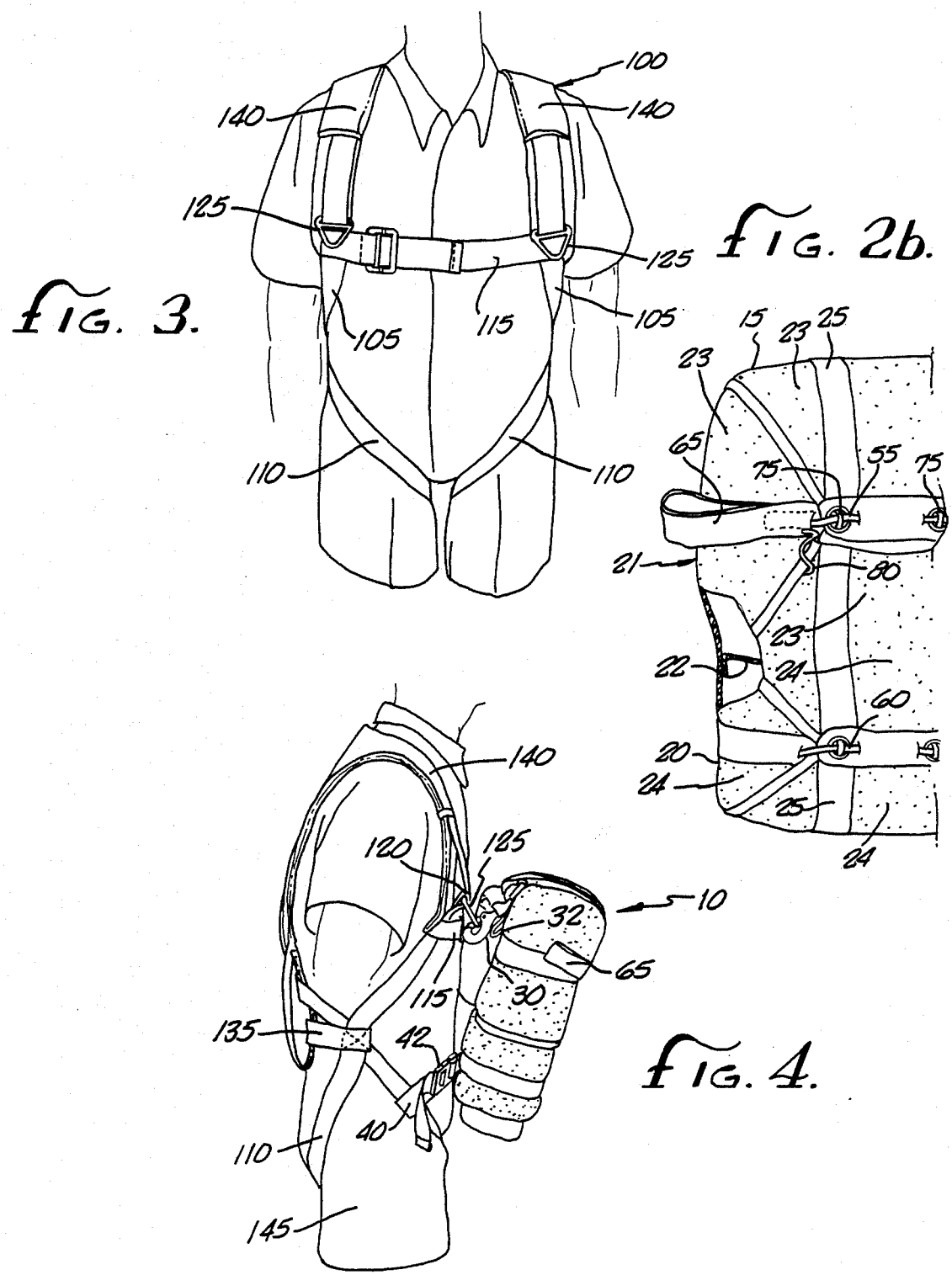

EMERGENCY PARACHUTE PACK

BACKGROUND OF THE INVENTION

This invention relates to emergency parachute packs to be used by crew members of an airplane when bailing out or when the plane is being ditched.

Safety is of paramount importance in both civil and military aviation. One way in which safety can be improved is by the provision of emergency equipment adequate to meet any reasonably predictable emergency. In appropriate circumstances, this includes the provision of parachutes for individual crew members. Additionally, when a possibility of bailing out over water or ditching the plane into a body of water exists, crew members and passengers should have some sort of flotation device such as life rafts, life vests, or floating seat cushions.

Whatever emergency equipment or clothing is provided should not unduly hamper the normal activities of the crew. The wearing of certain parachutes and similar equipment while operating an aircraft has been found to lead to impaired movement fatigue, discomfort, and a resulting disinclination to use the equipment. All of these can detract from the safety of the operation of an aircraft.

Safety equipment should, preferably, be light in weight. Not only does a heavy safety unit compound the disadvantages discussed above, it also adds to the overall weight of the aircraft, contributing to increased fuel consumption and decreased speed.

In the past and currently, the crew members in some military aircraft have worn a back-mounted parachute system which is intended for constant in-flight wearing. While these parachute systems provided reliable operation, and while they completely eliminated the time required to put them on in an emergency, these parachute systems suffered from the disadvantages of being uncomfortable and significantly restricting the movements of the crew member wearing the parachute system. If the crew member removed the parachute system and its associated harness, then the time required to put the parachute system back on in an emergency could be considerable. This could lead to loss of life.

Other military emergency parachute systems designed for aircrew members of some cargo aircraft had chest-mounted parachutes which were detachably connected to adjustable harnesses. These systems were very heavy. In addition, many World War Two vintage aircraft used seat-pack parachutes which were very heavy and uncomfortable.

Civilian emergency parachute systems exist which are lighter, thinner, and more comfortable than the military emergency parachute systems described above. One of the most popular is the Security Safety-Chute, which is a back-mounted chair-type parachute system that forms a complete chair when the crew member sits in the aircraft seat. Civilian emergency parachute systems which have back packs but are not chair-types include the Strong Enterprises ParaCushion Back, the Softie back pack systems, and my own Beta Emergency Back Pack. Further information on emergency parachute systems known to the art can be found in my paper (No. AIAA-81-0413), delivered to the AIAA 19th Aerospace Sciences Meeting in St. Louis, Missouri held on Jan. 12-15, 1981, and published by AIAA. This paper is hereby incorporated by reference in the present specification, as if fully set forth herein.

Emergency flotation devices have been provided for parachutists. Examples of such flotation devices are inflatable life vests and floats which may be attached to the parachutist's clothing or parachute harness, or have harnesses of their own. One such flotation device is the L.P.U. Flotation Chamber, an inflatable U-shaped float which is stored in a packet that may be removeably installed on the reserve parachute or on the harness of a parachutist. The L.P.U. Flotation Chamber does not, however, provide an integrated combination of parachute and flotation device.

The integrated combination of a flotation device with a backpack parachute is known in the prior art, although none of the prior art parachute systems described above have flotation devices. A typical example of a backpack parachute combined with a flotation device is the Navy NB-7 parachute combined with a rigid seat survival kit (RSSK) containing a raft and other equipment, as used by crew members of the E-2C aircraft. Such a combination would be useful when the aircraft is to be flying over water. The resulting combination of parachute and RSSK was a package that extended to the knees of the crew member wearing it. Such a pack was found to be seriously uncomfortable in the E-2C and made emergency egress nearly impossible. Subsequent efforts have been directed at decreasing the length of this assembly. Grumman Aircraft recently developed a system for the Navy that reduced the length and weight of the parachute/flotation assembly used in the E-2C.

The above-mentioned combination prior art device (NB7/RSSK) also suffered from the disadvantage of being relatively heavy, typically 50 pounds or more, as well as uncomfortable. Even the new Grumman assembly weighs approximately 37 lbs.

SUMMARY OF THE INVENTION

Accordingly, an object of the present invention is to provide an emergency parachute system which does not hamper the movements of crew members. A further object is to provide a system which is not heavy. Another object of this invention is to provide a parachute system which combines a parachute with one or more inflatable flotation devices, and other emergency gear. Still another object of this invention is to provide a parachute pack which need not be constantly worn by the crew member, but which may be installed quickly in the case of an emergency.

The parachute system of the invention comprises a chest-mountable pack having a plurality of adjoining compartments. A first compartment contains the parachute and associated gear. A Second compartment of the pack contains an inflatable life raft or similar flotation device. In a preferred embodiment, a third compartment of the pack contains a life vest or similar personal flotation device, and a fourth compartment contains survival gear. The first and second compartments of the pack are provided with ripcords for separate deployment of each compartment's contents. The second and third compartments are provided with zipper or Velcro ® hook/loop closures to allow easy access to the contents.

The pack, typically, is not worn by aircraft crew members during routine operation of the aircraft. A harness is provided to each crew member to be worn during flight. The harness is made of webbing of appropriate size and strength. By providing a harness which is specifically designed for the dimensions of a given crew member, a significant weight savings can be achieved over an adjustable harness. However, the use of an adjustable harness does not preclude the use of the pack described above. The harness is provided with mounting hardware adapted to receive the chest pack.

In an emergency, the chest pack is mounted onto the crew member's harness by means of snaps or similar connecting hardware, and (when appropriate) a stabilizing device, such as a "belly band" which may be passed around the torso of the crew member and secured to the pack, is provided. Whether the crew member is required to bail out of the aircraft while it is in flight, or leave the aircraft after it has ditched into a body of water, the actions which the crew member must take to prepare are the same.

Significant weight savings are achieved by using a custom harness as well as by using a single partitioned pack to contain the parachute, the inflatable flotation device and whatever additional equipment may be required, such as a life vest and survival gear. Additionally, the use of a quickly attachable chest-mountable pack means that the pack need not be constantly worn by the crew member. Thus, crew mobility and comfort are greatly enhanced. Further, the entire pack may be enclosed in an impermeable cloth or plastic membrane sac so as to prevent mildew and other environmental degradation. Thus, longevity and time between servicing of this emergency equipment may be greatly extended.

The more important features of the invention have been outlined very broadly. Additional features of the invention exist that will be set forth hereinafter in the detailed description of the preferred embodiment.

BRIEF DESCRIPTION OF THE DRAWINGS

FIG. 2b is a partial elevated front view, with partial cut-away, of a second preferred embodiment of the parachute pack of FIG. 1.

FIG. 3 is an elevated front view of a preferred form of a harness constructed according to the present invention, as worn by a crew member.

FIG. 4 is a side view of a crew member wearing the harness of FIG. 3 and the emergency parachute pack of FIG. 1.

DESCRIPTION OF A PREFERRED EMBODIMENT

The drawings and the following description relate to the emergency parachute packs which were designed for and utilized in the flight of the Voyager aircraft on its non-refueled, non-stop flight around the world in late 1986. The combined weight for emergency parachute pack systems for two crew members, including the weight of the harnesses and approximately 6 pounds of survival gear & radios, came to approximately 32 pounds, an average of 16 pounds per system. The parachute pack shown in FIGS. 1, 2a, and 5 is the pack made for Dick Rutan, and has a height (the vertical dimension of the pack when worn by a person standing upright, as in FIG. 4) of about fourteen inches, a width of about twelve inches, and a depth of about four inches.

I have found that an emergency parachute pack according to the invention should not be bulky, for convenience of storage, comfort, and ease of use. The emergency parachute pack according to the invention should, therefore, preferably have a height substantially no more than half that of the torso (crotch to neck) of the person who is to wear it.

Figure 1:
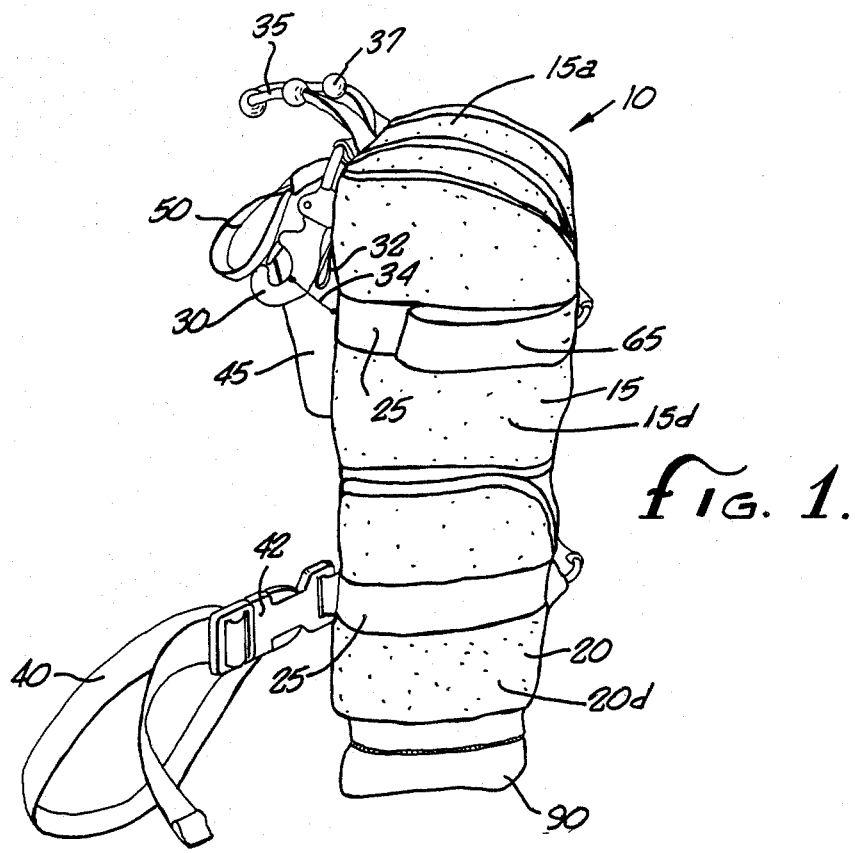
FIG. 1 is a side view of a preferred form of the emergency parachute pack as discussed herein.
Figure 2A:
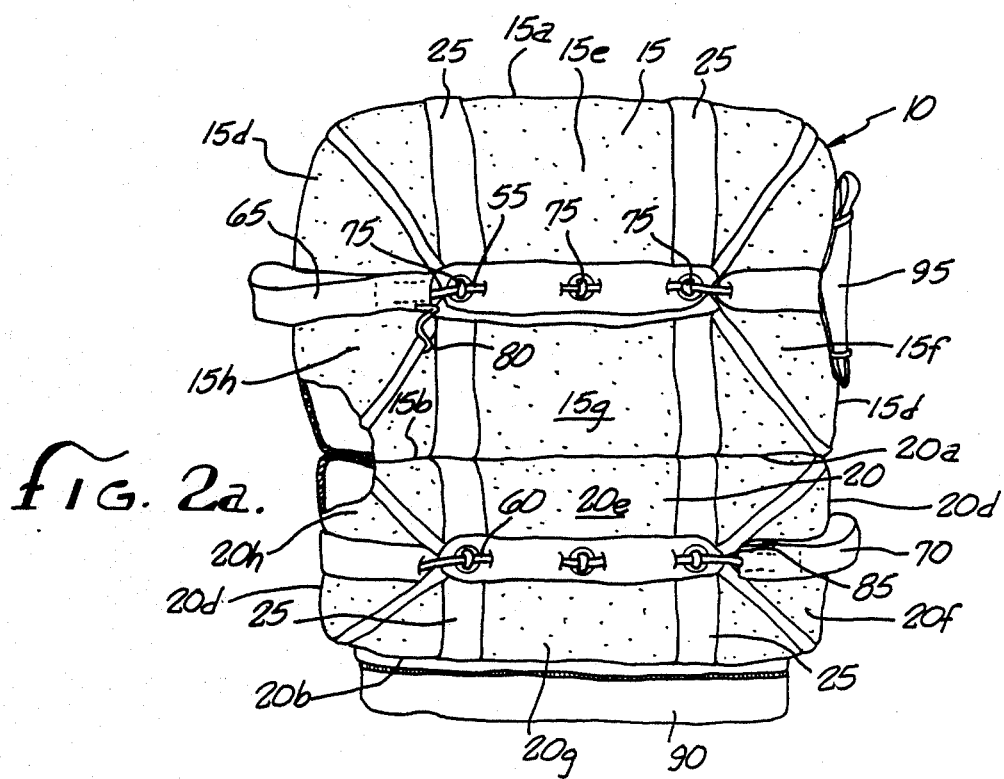
FIG. 2a is an elevated front view of the parachute pack of FIG. 1, with a partial cut-away.
Figure 5:
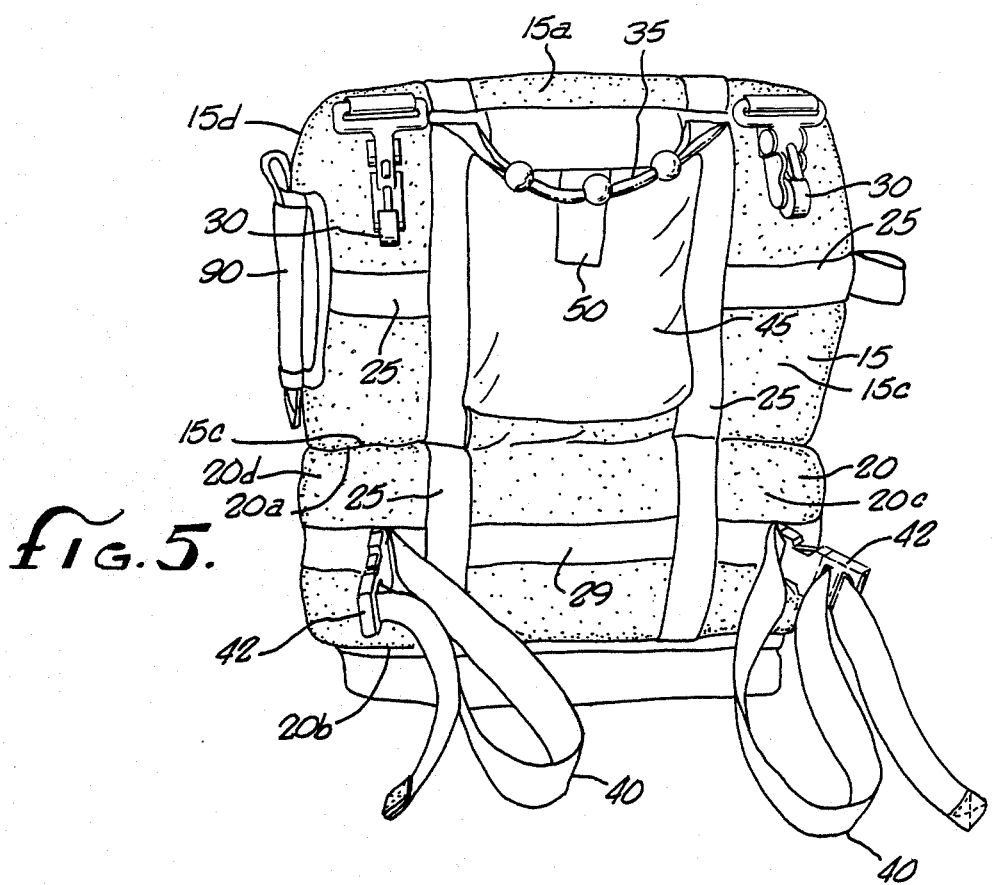
FIG. 5 is an elevated back view of the parachute pack of FIG. 1.

As shown in FIGS. 1, 2a, and 5, a pack 10 has a first or upper compartment 15 for a parachute adjoining and connected (sewn to) a second or lower compartment 20 for a life raft. The pack is constructed out of a lightweight strong fabric, preferably nylon. The pack may also be formed of thermoplastic, fiberglass or other materials, as is well known to the art, but the following discussion will assume the material is a nylon fabric, as was used in the parachute packs carried on the round-the-world Voyager flight. The top compartment has top, bottom, back, and (two) side walls 15a, 15b, 15c, 15d, respectively, and front flaps 15e, 15f, 15g, and 15h. The lower compartment 20 has top, bottom, back, and (two) side walls 20a, 20b, 20c, and 20d, respectively, and front flaps 20e, 20f, 20g, and 20h. The two compartments are sewn together, the top wall 20a of the lower compartment 20 adjoining the lower wall 15b of upper compartment 15. The pack walls are reinforced with nylon webbing 25.

Alternatively, in a second preferred embodiment of the parachute pack, the first and second compartments of the parachute pack may be formed as one large compartment 21 as shown in FIG. 2b. The large compartment 21 has top, bottom, back, and side walls, an internal partition 22 generally parallel to the top and bottom walls, and upper and lower openings corresponding to the upper and lower compartments 15 and 20 formed by the internal partition. The upper opening would be provided with front flaps 23 for deployment of the parachute. The lower opening would be provided with front flaps 24 of the life raft.

Other arrangements of the first and second compartments are possible although not shown in the drawings. For example, the first and second compartments could be side-by-side or front-and-back. The top-and-bottom arrangement described is practical and successful, but the invention must be understood as not being limited to this arrangement.

Two attachment devices or metal snaps 30, seen in FIGS. 1 and 5, are provided at the upper portion of the pack 10. Preferably, these snaps will be of a positive locking variety, for example, the snaps described in Military Specifications 22040 or 22017. The snaps must be of sufficient tensile strength to support the crew member during the opening of the parachute, because the risers of the parachute are connected to the snaps from inside upper compartment 15 in a manner well known to the art. The snaps as used on the Voyager have quickrelease loops 32 attached, which, when tugged, release the snaps from whatever D-rings, O-rings or V-rings to which the snaps may be attached. The snaps are normally detachably secured against pack 10 by breakable threading 34, as is best seen in FIG. 1. The risers may also be fitted with an additional release mechanism such as the Booth 3-ring release system described in U.S. Pat. No. 4,337,913, the disclosure of which is hereby incorporated by reference as though fully set forth herein or various other devices to permit quick release of the parachute upon entering the water or landing on ground.

A carrying handle 35 may be observed in FIGS. 1 and 5. Carrying handle 3 adds to the ease with which parachute pack 10 may be handled. Plastic balls 37 on carrying handle 35 permit the identification of the pack by feel, even in the dark. This is important if several crew members have packs with different sized parachute canopies (selected according to the weight of the crew member), in which case each crew member should be able to find the correct pack under any circumstances. Stabilizing bands 40 may be provided to help maintain the position of the pack on the body of the crew member wearing the pack, and may be seen in FIGS. 1 and 5.

A third or rear compartment 45 (see FIGS. 1 and 5) is provided, appropriately sized to receive a life vest or similar personal flotation device. This device is extracted by pulling a tab 50 which protrudes from the rear compartment 45. Since it may be impractical, if not highly dangerous, to inflate the life raft stowed in the lower compartment 20 until the crew member is in the water, the crew member may be provided with a degree of personal flotation prior to entry into the water by removing, donning, and inflating the personal flotation device provided in the rear compartment 45. Suitable personal flotation devices are the personal flotation devices manufactured by Irvin Industries Canada for parachute troops and the Eastern Aero Marine model HC-2 (modified by removing one chamber). The latter was the one actually used in the Voyager around-the-world flight. Thus, a crew member may be protected by having the personal flotation device on during bailing out. Once the crew member has entered the water, he or she may then deploy the life raft which will provide longer-term survival in the water.

Two ripcords of plastic coated steel cable are provided for parachute pack 10 and are best seen in FIG. 2. An upper ripcord 55 is used to deploy the parachute stowed in upper compartment 15, and a lower ripcord 60 is used to deploy the inflatable life raft stowed in lower compartment 25. Preferably, the handles 65 and 70 of the upper and lower ripcords 55 and 60 will be color coded and disposed on opposite sides of the pack 10 so as to minimize the risk of error. Handles 65 and 70 are loops of nylon tape sewn onto the ripcords and are normally secured to reinforcing webbing 25 by Velcro® hook and loop closures. Upper ripcord 55 passes through the protruding ends of nylon loops 75 which pass through grommets 80 in the flaps 15e, 15f, 15g, and 15h of the upper compartment 15 in order to help maintain the shape of the compartment 15. When the ripcord 55 is withdrawn from the loops 75, the four flaps 15e, 15f, 15g, and 15h of the upper compartment 15 of the pack 10 open freely, permitting the parachute (not shown) contained therein to be deployed by the pull of a soft pull-out pilot parachute (not shown) attached to the ripcord handle 65. The soft pull-out pilot parachute is attached to handle 55 by a short firs nylon cord 80 and is stowed inside upper compartment 15 when not in use. The crew member deploying the parachute must extend the handle 55 far enough to draw the pull-out pilot chute into the airstream.

A spring-type pilot chute may also be used, although the ripcord cable would be changed somewhat. A soft pull-out pilot parachute, deployed manually, is described in U.S. Pat. No. 4,039,164 to Booth. The disclosure of U.S. Pat. No. 4,039,164 is hereby incorporated by reference, as though fully set forth herein. The use of the soft pilot is not essential to the invention, although it is believed to be preferable to a springtype pilot parachute.

In a like manner, the ripcord 60 to the lower compartment 20 may be withdrawn by pulling o handle 70, allowing lower compartment 20 to open and the life raft (not shown) contained therein to be inflated and deployed. Preferably, the life raft will be attached to a lanyard secured to pack 10. An inflation device such as a $CO_2$ gas canister may be interconnected with the ripcord handle 70 by a second nylon cord 85 so as to permit semiautomatic or simultaneous inflation of the life raft.

Additional survival gear may be contained in the fourth or zippered auxiliary compartment 90 provided at the bottom of pack 10. This auxiliary compartment may be seen in FIGS. 1, 2a and 5. During the world record round-the-world flight of the Voyager in 1986, this auxiliary compartment held a strobe light, flares, signal mirror, survival knife/tool, survival booklet, Mini-Mag® flashlight, emergency blanket, and food tablets.

A satellite transponder may be carried in pocket 95, which may be seen in FIGS. 2a and 5.

Pack 10 may be enclosed in an impermeable (moisture-proof) cloth or plastic membrane sac when it is not in use. This will prevent mildew and other environmental degradation. The sacs would typically have a method to allow rapid extraction of the parachute pack from the sac. Such a method could be a tearout panel or rip-wire designed to split open the sac. Suitable materials for such sacs are described in (but are not limited by) Military Specification MIL-B-131 which covers long term packaging methods.

Turning now to FIG. 3, a harness 100 is provided having main lift webs 105, leg straps 110, and a chest-strap 115. Attached to each main lift web 105, and best seen in FIG. 4, is a loop of webbing 120 which is threaded through a V-ring 125 (D-rings and O-rings are also acceptable). V-ring 125 mates with the snaps 30 of the chest pack 10. In normal aircraft operation, each crew member wears his or her harness 100 as shown in FIG. 3. The harness 100 may be additionally provided with pockets (not shown) for the convenient storage of frequently used equipment, instruments or additional survival equipment. The harness is custom-fitted to the crew member, i.e., fits the crew member without the need for adjustment buckles and the like.

Figure 6:
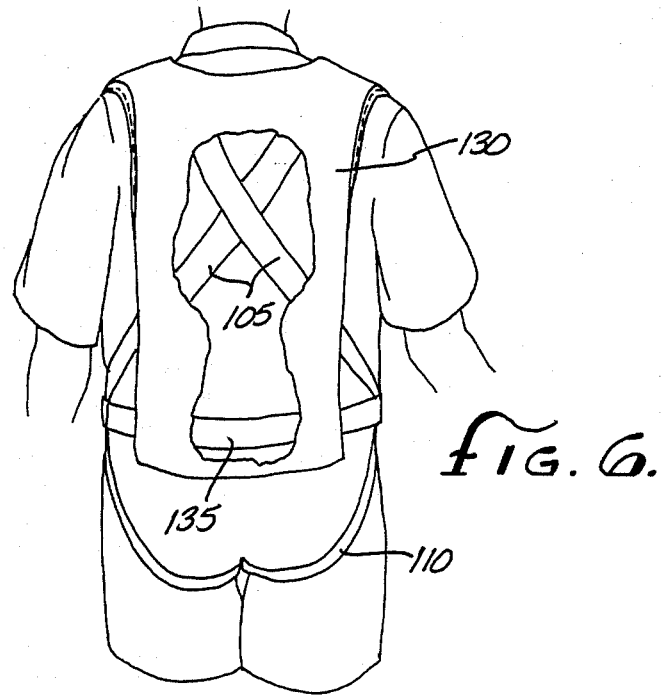
FIG. 6 is an elevated back view with cut-away of the harness of FIG. 3.

The harness 100 is provided with a back portion 130 which resembles the back half of a vest, and is best seen in FIG. 6. Back portion 130 is a rectangular nylon cloth sleeve with foam padding built in for comfort. Main left webs 105 and back band 135 fit into this back portion 130 and are revealed in the cut-away of FIG. 6. The back portion 130 has integral padded shoulder extension 140.

Turning now to FIG. 4, aircraft crew member 145 is wearing the harness 100 to which he has attached the emergency parachute pack 10 by attaching the snaps 30 to the V-rings 125 located on the main lift webs 105, and additionally by passing the stabilizing bands 40 around leg straps 110. The stabilizing bands have plastic snap-attaching adjustable buckles 42 which permit quick fastening of stabilizing bands 40 to leg straps 110, add easy subsequent adjustment. Suitable buckles are made by the Nexus Corporation of Elkgrove, Illinois, sold under the Fastex® trademark, and described in U.S.

Pat. Nos. 4,150,464 and 4,171,555 (the contents of which patents are hereby incorporated by reference as though fully set forth herein). The stabilizing bands are also long enough to fasten around a leg or the waist of the crewmember.

At this point, the crew member 145 is prepared for bailing out over land or water or ditching into water. For bailing out, the crew member need only exit the aircraft and inflate the parachute at the appropriate time by withdrawing the upper ripcord 55. If bailing out over water, the crew member may then withdraw the life vest from the rear compartment 45 by pulling on the tab 50 and then donning the life vest. Whether bailing out or ditching, the life raft contained in the lower compartment 20 is deployed after entry into the water by withdrawing the lower ripcord 60. Thus, regardless of the specific emergency situation, the necessary steps to be taken prior to exiting the aircraft are the same.

By providing a harness 100 which is specifically sized for the crew member who will be wearing it, a significant weight reduction over previous adjustable systems can be achieved. The present invention dispenses with the need for adjustment hardware or loose material. This in turn makes the entire assembly more comfortable for the wearer. As will be appreciated by those skilled in the art, however, a standard harness adapted to receive a chest pack may be used with the parachute pack of the present invention.

The emergency parachute pack of the present invention may be employed with parachute canopies which are well-known to the art and commercially available. Such parachutes are described in *The Parachute Manual: a Technical Treatise on Aerodynamic Decelerators* (3d ed., pub. by Para Publishing, 1984, Santa Barbara), authored by Dan Poytter, the contents of which are incorporated by reference herein as if fully set forth herein, as is also the Para-Gear 1984–1985 Catalog #50 published by Para-Gear Equipment Co. which describes commercially available emergency parachutes. The selection, care of, packing, rigging, deployment, and use of such parachutes is well-known to the art. Conical canopies appropriately sized for the weights of the respective crew members were used in the Voyager flight; specifically, Phantom conical canopies supplied by National Parachute Industries (26-foot for Dick Rutan and 22-foot for Jeanna Yeager).

The preferred flotation device for the lower compartment 20 is the miniBoat, a commercially available one-man life raft which has a light weight and small pack volume. The raft itself is on a 20-foot lanyard that is attached to the pack. Under most conditions, the raft would not be released and inflated until water entry. Delaying raft activation is necessary to prevent entanglement of the raft with the parachute.

Thus, an emergency parachute pack has been provided. Those skilled in the art will appreciate that the conception upon which this disclosure is based may be used as a basis for the designing of other structures, for carrying out the several purposes of the invention. The claims, therefore, should be regarded as including such equivalent constructions as do not depart from the spirit and scope of the invention, which is intended to be defined by the appended claims.

What is claimed is:

1. A chest-mountable parachute pack for use with a harness comprising, in combination:
   a first compartment adapted to contain and deploy a parachute,
   a second compartment adjacent to and connected to the first compartment, the second compartment being adapted to contain and deploy an inflatable flotation device,
   the first compartment and the second compartment each being provided with a rip-cord for separate deployment of the parachute and the inflatable flotation device, and
   a plurality of attachment devices whereby said parachute pack may be releaseably attached to said harness.

2. The parachute pack of claim 1 wherein the first compartment is located above and adjacent to the second compartment.

3. The parachute pack of claims 1 or 2 wherein said attachment devices comprise snaps.

4. The parachute pack of claim 1 wherein the height of the pack is no more than substantially one half the height of the torso of the person who is to use the parachute pack.

5. The parachute pack of claim 1 additionally comprising a third compartment adjacent to and connected to either of the first or second compartments, the third compartment being adapted to removably contain an inflatable life vest.

6. The parachute pack of claims 1 or 2 additionally comprising a fourth compartment adjacent to and connected to either of the first and second compartments, the fourth compartment being adapted to removeably contain survival gear.

7. The parachute pack of claims 1, 2 or 4 wherein the pack may be removeably enclosed in an impermeable sac.

8. An emergency parachute system comprising:
   a harness having a plurality of main lift webs, the main lift webs having receiving means to which a parachute pack may be attached in front of the chest of a person wearing the harness,
   a parachute pack having an upper compartment adapted to contain and deploy a parachute,
   a lower compartment adapted to contain and deploy an inflatable flotation device, the lower compartment being contiguous with the upper compartment,
   and attachment means whereby said pack may be connected to said receiving means.

9. The system of claim 8 wherein said receiving means comprises D-rings, V-rings, or O-rings and said attachment means comprises snaps.

10. The system of claim 8 wherein the harness is custom-fitted.

11. The parachute pack of claim 8 wherein said parachute pack may be removably enclosed in a moisture-proof sac.

12. A chest mountable emergency parachute pack comprising a front, a rear, a top, a bottom, and two sides, wherein said front further comprises an upper opening adapted to allow the deployment of a parachute therethrough and a lower opening adapted to allow the deployment of a flotation device therethrough, an internal partition, generally parallel to said top and said bottom and attached to said sides, front, and rear, the internal partition dividing the parachute pack into an upper and a lower compartment associated with said upper and lower openings, respectively, a rear compartment attachment to said rear adapted to temporarily store a personal flotation device, and snaps attached to said rear generally adjacent to said top, said snaps adapted to being attached to a harness.

* * * * *